United States Patent [19]

Santamaria

[11] 4,300,857
[45] Nov. 17, 1981

[54] MARINE BARRIER

[75] Inventor: Joseph P. Santamaria, Westwood, Mass.

[73] Assignee: Oiltrol, Inc., Dedham, Mass.

[21] Appl. No.: 143,465

[22] Filed: Apr. 24, 1980

[51] Int. Cl.$^3$ ............................................. E02B 15/04
[52] U.S. Cl. ...................................... 405/70; 52/162; 405/72; 405/118
[58] Field of Search ...................... 405/32, 35, 63, 64, 405/70, 71, 72, 115, 66, 21, 23–27, 118; 52/162

[56] References Cited

U.S. PATENT DOCUMENTS

| | | | |
|---|---|---|---|
| 3,640,073 | 3/1972 | Samsel | 405/72X |
| 3,691,773 | 9/1972 | Ruhlman | 405/70 |
| 3,852,978 | 12/1974 | Fossberg | 405/70 X |
| 3,903,701 | 9/1975 | Gauch | 405/66 |
| 4,023,314 | 5/1977 | Tamner | 52/162 X |

FOREIGN PATENT DOCUMENTS 643136  7/1962  Italy ..................... 405/118

Primary Examiner—Ernest R. Purser

Attorney, Agent, or Firm—Weingarten, Schurgin & Gagnebin

[57] ABSTRACT

A marine barrier adapted for deployment as a curtain to divert the flow of water or for use as an oil containment boom and a method for installation thereof. The barrier typically includes a vertically disposed curtain having floats positioned in opposed relation along each side thereof in an outrigger configuration, and parallel, spaced, vertically aligned reinforcing ribs disposed within pockets formed on the surface of the curtain. The bottom edge of the curtain may be weighted with ballast to maintain its vertical orientation. When the barrier is used for diversion purposes, the bottom edge is anchored preferably by self-burying anchors. Typically, a plurality of parallel barriers are employed in a staggered configuration so as to create a baffle through which the water must flow. The diversion barrier typically is anchored along one edge to the shore and along another edge to a post within the body of water. The diversion curtain may be contoured along its bottom edge to conform to the shape of the bottom of the basin containing the water. When deployed as an oil containment boom, it surrounds the area containing the oil spill.

9 Claims, 10 Drawing Figures

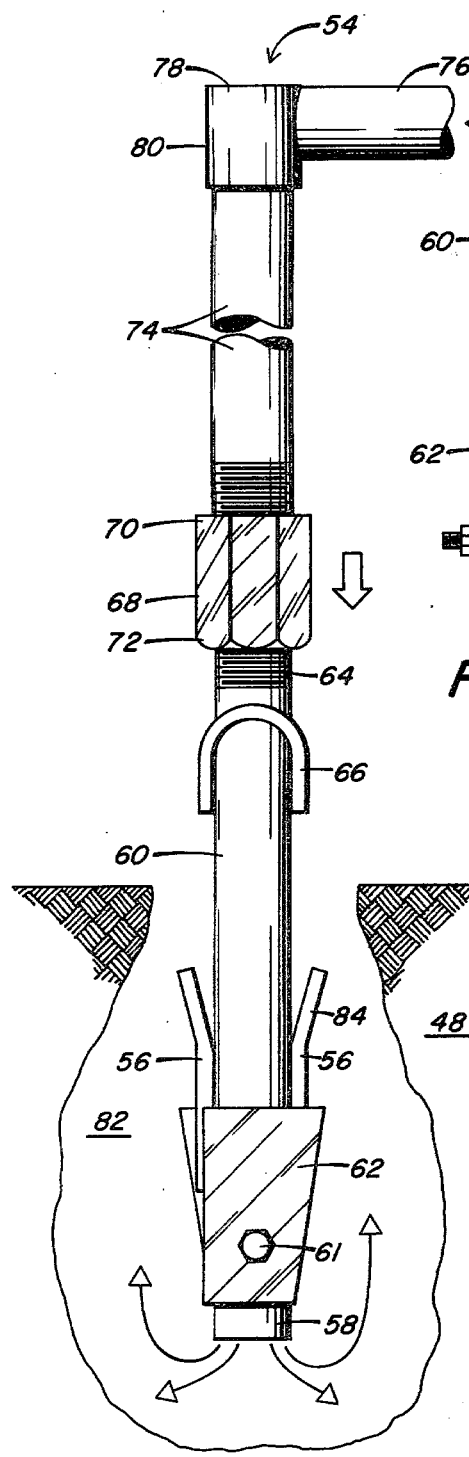
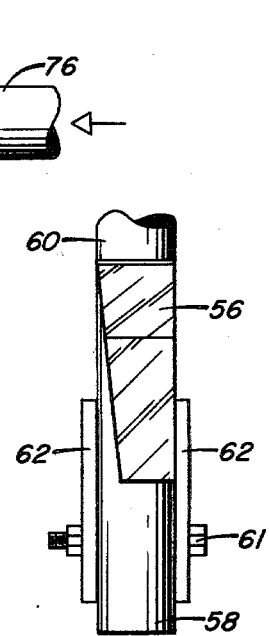
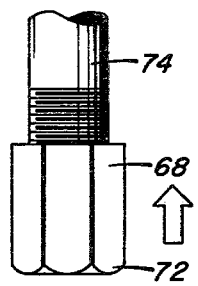
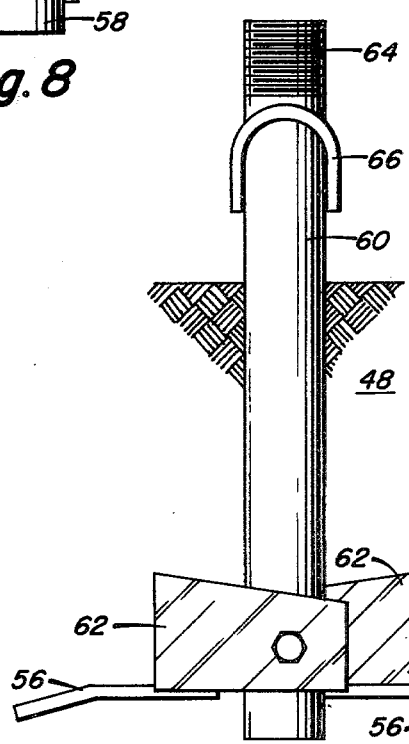
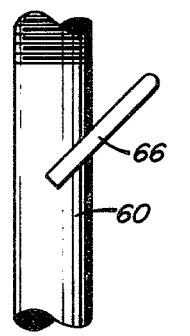
Fig. 7  Fig. 8  Fig. 9  Fig. 10

MARINE BARRIER

FIELD OF THE INVENTION

The present invention relates generally to marine barriers and more particularly concerns marine barrier curtains adapted to divert the flow of water or to contain a chemical or oil spill, and the method of installation thereof.

DISCUSSION OF THE PRIOR ART

In many applications it is desirable to be able to slow the rate of flow of waste water or a fluid as it passes through a treatment basin. Instances where such slowing is desireable include the treatment of hot cooling water from a power plant or the treatment of waste water from a chemical or manufacturing plant. In the case of heated cooling water, the water must be permitted to cool to ambient temperatures prior to its reintroduction into surrounding streams and rivers. With regard to the waste fluid from other sources, the particulate matter in chemical wastes must be removed by sedimentation, and often oxygen must be returned to the water by aeration prior to its release. Tests have shown that if such a barrier is not erected, the fluid often will flow directly from the outlet of the power plant or factory to the outflow of the cooling or sedimentary basin in a period of time far too short to permit the proper treatment of the waste-bearing or heated water. This fluid merely forms a stream within the treatment basin which passes down the center thereof and does not mix with the water already present within the basin.

Presently, there are no devices available for producing such a diversion structure which are inexpensive and which are relatively easy to install. The use of solid jetties to divert water flow is known, as is shown by U.S. Pat. No. 159,596. However, such devices are very expensive and difficult to install, and are designed for diversion of flows of water on a large scale. Other sorts of reinforced, permanent structures are also available for diversion of flows and for the creation of a baffling effect on those flows, but presently no inexpensive and easily deployable structures, such as curtains, are available in the prior art for such a use. The use of curtains for containment of debris or oil floating on the surface of the water is known, as is shown by U.S. Pat. Nos. 3,667,235; 3,882,682; 3,919,847; 3,922,861; 3,924,412; and 3,943,720. However, none of the above devices is suitable for diversion of water currents, because the lower edge thereof is generally flexible and does not extend to the bottom of the body of water. Although some diversion may take place, the majority of water will flow through unaffected. U.S. Pat. No. 2,655,790 discloses a barrier which extends to the bottom of the body of water, however, it is permeable to water and does not effectively divert fluid flows. Other curtains which are secured to the bottom of a basin include those in U.S. Pat. Nos. 3,844,123; 3,879,951; 3,928,978; and 3,984,987. Although each of the above referenced patents is tethered to the bottom, each is provided with ports or slots through which the water may pass and is not completely effective to provide the baffling effect required. In addition, U.S. Pat. No. 3,984,987 discloses a curtain which is held together only by magnets and which may be separated easily by the application of pressure at the magnetic junctions. Furthermore, none of the above cited prior art discloses a means for tethering a free end of the curtain if found in the middle of a water basin. Bearing these deficiencies in mind, the unique advantages of the present invention will become apparent.

SUMMARY OF THE INVENTION

An object of this invention is to provide a barrier which may be utilized to divert a flow of water passing from one end to the other in a water basin. A further object of this invention is to provide such a barrier that is inexpensive and relatively easy to deploy. A third object of this invention is to provide such a barrier that will withstand normal rates of flow in a body of water and which is resilient enough to withstand high wind and flow conditions.

Broadly speaking, this invention concerns a marine barrier particularly suited for deployment to divert a flow of water passing through a basin. More particularly, the barrier includes a curtain which is suspended from a floatation device at the surface of the water and which extends downwardly to the bottom of the water basin. The curtain also projects upwardly beyond the floatation device and above the surface of the water a predetermined distance. Inserted within pockets within the curtain are a plurality of parallel, spaced, vertically aligned reinforcing ribs extending from the top to the bottom of the curtain. The floatation device preferably has an outrigger configuration, wherein a pair of floats is attached to opposite sides of the curtain at the same position thereon. Protective plates are bolted onto the curtain at each end of the strap to prevent the strap from becoming dislodged from the curtain. The curtain is tethered at its free end to vertically positioned posts by ropes or wires passing through grommets in reinforced edges. The bottom edge of the curtain is contoured to conform to the shape of the bottom of the water basin, and the curtain is anchored at its bottom edge by self-burying anchors using a pressurized fluid. Ballast may be provided along the lower edge of the curtain to position it vertically until it is properly anchored.

These barriers may be deployed in a baffle configuration creating a maze through which the water must pass, thereby slowing its rate of flow. Each barrier is disposed generally perpendicularly of the direction of flow, and extends from one shoreline to a point in the middle of the water basin spaced from an opposite shoreline. A plurality of barriers is alternately positioned on the one shoreline and on the opposite shoreline to create the baffle effect. These barriers may also be deployed as a boom for containment of oil and other waste spills. When used as a boom the barrier is generally untethered and the vertical sides are secured together to surround an area of water.

The use of the curtain of the present invention permits creation of a barrier far less expensive than the jetties found in the prior art. Furthermore, the entire curtain may be constructed prior to deployment, so that each section of the baffle or boom structure may be installed in place in a matter of hours. Furthermore, since the curtain is anchored to the bottom when used as a baffle, it is effective to divert the flow in the manner desired. The tethering devices used are sufficiently flexible to withstand high wind conditions, and the straps provide the necessary strength, flexibility and rigidity to the curtain itself.

DESCRIPTION OF THE DRAWING

The present invention can be more fully understood from the following detailed description and accompanying drawing, in which:

FIG. 7 shows the anchor of FIG. 6 being imbedded in place;

FIG. 8 is a side view of the anchor of FIG. 7;

FIG. 9 shows the anchor of FIG. 7 in a deployed condition; and

FIG. 10 is a side view of the anchor of FIG. 9.

DETAILED DESCRIPTION OF THE INVENTION

Figure 1:
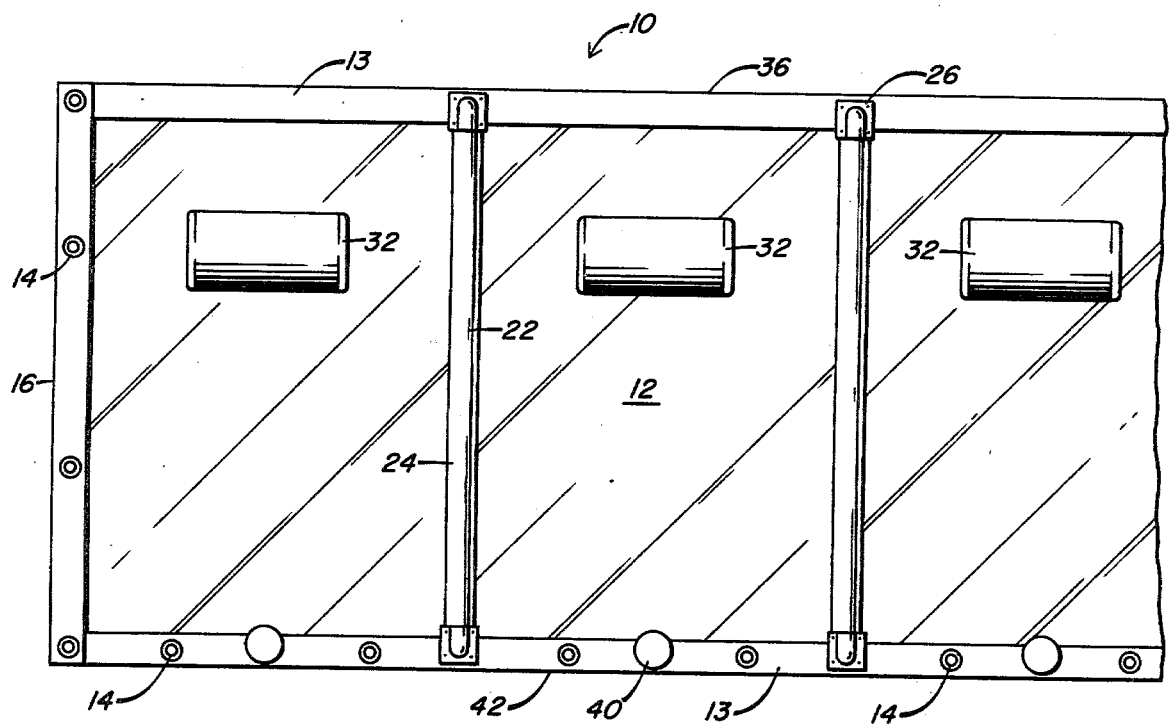
FIG. 1 is a side view of a portion of the barrier of this invention.
Figure 2:
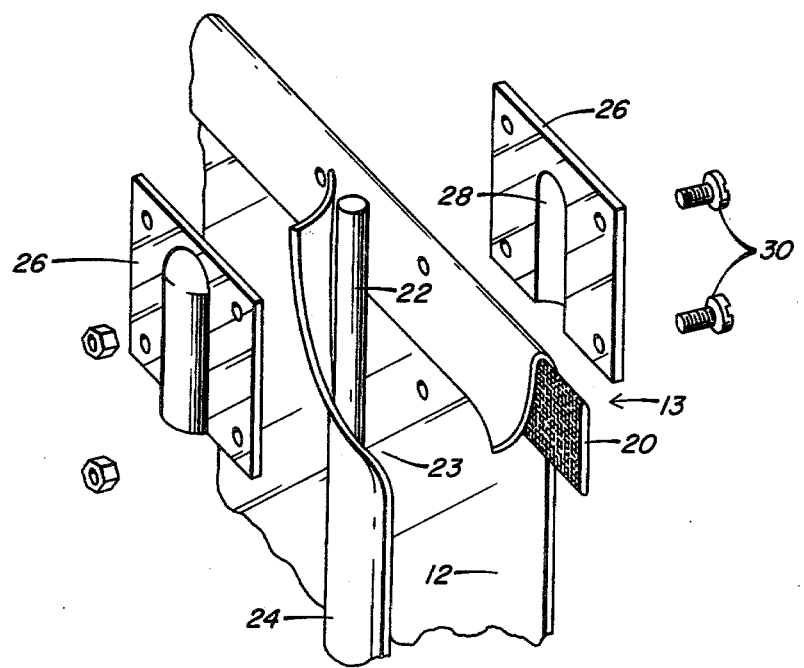
FIG. 2 is an exploded perspective view of one portion of the barrier of FIG. 1.

A preferred embodiment of the invention is shown in FIGS. 1 and 2. A barrier 10 includes a curtain 12 formed of a flexible material impervious to water. The perimeter of the curtain is provided with a reinforcing strip 13 produced by folding the edge over onto itself and inserting a strip of reinforcing material 20 into the fold, as shown in FIG. 2. The folded edge is then stitched together, preferably by use of a double locked stitch. Grommets 14 may be provided along ends 16 and along bottom edge 42 on reinforcing strip 13. Ribs 22 are vertically aligned and are arrayed along the length of curtain 12 in an equally spaced parallel relationship. Ribs 22 supply rigidity to curtain 12, yet are flexible enough to bend under the application of extreme force, and are resilient enough to return to their normal shape subsequent to being bent. Ribs 22 are preferably disposed within a pocket 23 formed by a strip of curtain material 24 stitched to the curtain 12 along one side thereof. Reinforcing plates 26 are secured onto both sides of curtain 12 at the ends of ribs 22 by means of bolts 30 or other known securing means. Plates 26 preferably have a recess 28 which is contoured to accommodate the shape of the end of ribs 22. Typically, one set of bolts 30 passes through both plates 26 to secure them together and to secure both plates 26 to curtain 12. Plates 26 serve to prevent ribs 22 from popping out of pocket 23 and to prevent strip 24 from being torn free of curtain 12. Ribs 22 ensure that curtain 12 retains sufficient rigidity to remain vertically positioned in a water flow while still remaining flexible enough to absorb high winds or waves.

Figure 4:
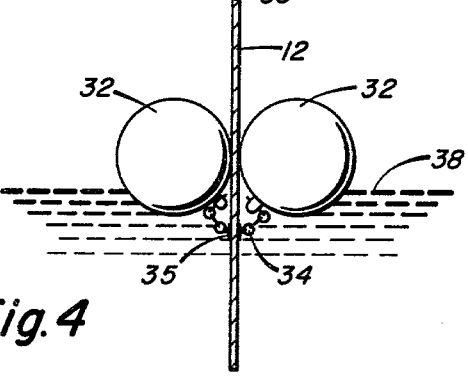
FIG. 4 is a cross-sectional view of the barrier of FIG. 1.

A plurality of floats 32 is attached to curtain 12 along the length thereof to maintain an upper edge 36 thereof above water level 38, as shown in FIG. 4. Floats 32 are preferably disposed directly opposite one another along each side of curtain 12 in an outrigger configuration. Floats 32 are preferably attached intermediate spaced ribs 22 by means of chains 34 secured at one end to curtain 12. Chains 34 are typically attached to curtain 12 at a distance below top edge 36 greater than the sum of the length of chain 34 and the diameter of float 32 so that edge 36 always remains above water level 38. A bolt passing through curtain 12 secures each pair of opposed chains 34 to curtain 12 on a plate 35. Chains 34 are provided with hooks on the end thereof which may be inserted through loops formed on the surface of floats 32. In this manner, floats 32 are easily removed from curtain 12 for replacement or repair. Floats 32 are typically sealed hollow cylinders.

A plurality of weights 40 serving as ballast may be provided along bottom edge 42. Weights 40 are attached to reinforcing strip 13 along edge 42, preferably intermediate ribs 22, and directly below floats 32. Weights 40 may be composed of lead or any other material which is significantly heavier than water. Weights 40 anchor lower edge 42, maintaining curtain 12 in a vertical orientation, and keeping lower edge 42 below water level 38.

Figure 5:
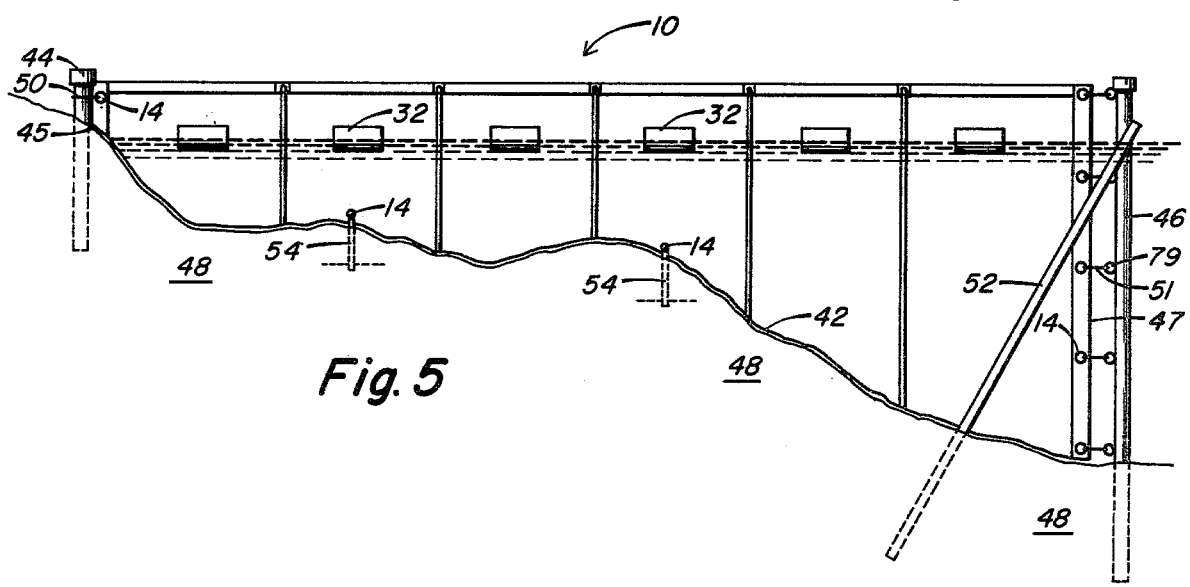
FIG. 5 is a side view of the barrier of FIG. 1 as deployed in a water basin.

FIG. 5 shows barrier 10 in a typically deployed condition. A post 44 is imbedded into the ground or underlying surface 48 at one end 45 of barrier 10 while another post 46 is similarly imbedded into the ground or underlying surface 48 at the other end 47 of barrier 10. End 45 of barrier 10 is secured snugly adjacent post 44 by means of lines 50 which pass through grommets 14. End 47 of barrier 10 is spaced from post 46 and is secured thereto by lines 51 which similarly pass through grommets 14 and cooperating loops 79 in post 46. Lines 50 and 51 are preferably formed of Nylon or some other resilient material which permits a certain amount of stretching. End 47 of barrier 10 is separated from post 46 a distance sufficient to permit the desired tensioning of curtain 12 by tightening or loosening lines 51. Where curtain 12 must withstand strong lateral forces and thus, requires a great deal of tensioning at post 46, a pair of support posts 52 may be employed. Support posts 52 are attached to post 46 on either side thereof adjacent an upper end and extend therefrom at an acute angle with respect to post 46 toward post 44 and outwardly away from curtain 12. The bottom ends of posts 52 are imbedded in the ground or surface 48 at a point spaced from curtain 12 and post 46 and on a side of post 46 facing post 44. Posts 52 thus brace post 46 and prevent it from moving laterally or from moving toward post 44.

Edge 42 is preferably positioned as close to the ground or surface 48 as possible and edge 42 should be retained in that position to prevent passage of water underneath curtain 12. To accomplish this goal, the shape of edge 42 is contoured to conform to the underlying shape of surface 48, as shown in FIG. 5. In addition, edge 42 must be anchored. Although in some conditions weights 40 are adequate to anchor lower edge 42, where strong curents are found or where the movement of silt or other materials along surface 48 produces pressure against lower edge 42, additional means for anchoring edge 42 must be provided. Weights tethered to grommets 14 along edge 42 may be utilized, example of such weights being cement blocks. Generally, however, it is preferred to utilize anchors 54 where surface 48 is soft enough and not composed of rock or concrete, as shown in FIGS. 6-10. An anchor 54 preferably includes a hollow cylinder 60 having a pair of flukes 56 pivotably mounted about axle 61 adjacent an end 58 thereof. Flukes 56 are shown pivoted about axle 60 into a retracted position in FIGS. 7 and 8 and are shown in their unretracted or extended position in FIGS. 9 and 10. Associated with each fluke 56 is a plate 62 which is attached along one edge thereof to be substantially perpendicular of the surface of fluke 56. Plates 62 of both flukes 56 are generally disposed in a spaced, parallel, confronting relationship, capturing cylinder 60 therebetween. Axle 61 typically comprises a bolt passing through cylinder 60 and both plates 62. Flukes 56 are also disposed opposite one another and when extended are separated by an angle of approximately 180°. Flukes 56 each have an outwardly flared portion 84 disposed on the distal ends thereof.

Figure 6:
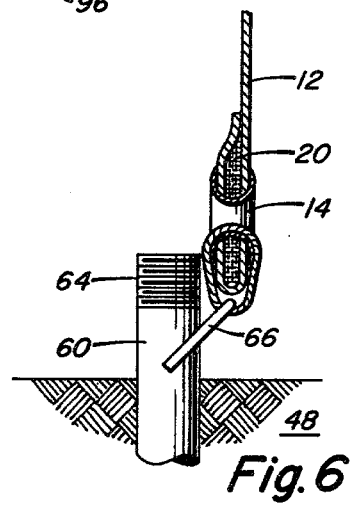
FIG. 6 shows an anchoring rope of the barrier of FIG. 5.

Cylinder 60 is provided with a sharpened or beveled edge around the perimeter thereof at end 58. This sharpened edge permits end 58 to be more rapidly buried in the ground or surface 48. Attached adjacent an upper end 64 of cylinder 60 is a loop 66 which is adapted to be secured by a rope or other attaching device to a grommet 14, as shown in FIG. 6. End 64 is threaded and adapted to receive a similarly threaded bolt 68. Bolt 68 has an upper threaded portion adjacent end 70 and a lower threaded portion adjacent end 72. The upper threaded portion has threads which go in a direction opposite to those in the lower threaded portion thereof. Thus, for example, the lower threaded portion adjacent end 72 and the threaded portion of cylinder 60 adjacent end 64 may have right-handed threads, while the upper threaded portion of bolt 68 adjacent end 70 may have left-handed threads. The upper-threaded portion of bolt 68 is adapted to receive a pipe 74 threaded in the same manner adjacent an end 76. Pipe 74 is adapted to be connected to a source of pressurized water or air, and is hollow along its extent. Pipe 74 may be connected to another pipe 76 disposed perpendicularly thereof by right angle connector 80 to provide a horizontal surface 78.

The manner of installing anchor 54 will now be described with reference to FIGS. 6 through 10. Pipe 76 is connected to a supply of pressurized water or air which is conducted through pipe 76, connector 80, pipe 74, cylinder 60 and out through end 58 thereof, as shown by the arrows of FIG. 7. End 58 of anchor 54 is placed on an area of surface 48 where it is desired to be implanted, and the pressurized water or air acts to dig out a cavity 82 below end 58 into which anchor 54 settles. Force may also be applied to anchor 54 along surface 78 to further drive it into cavity 82. The sharp edges along end 58 facilitate the burying of the anchor 54. As anchor 54 is settling into cavity 82, flukes 56 are in their retracted position as shown in FIGS. 7 and 8, and the anchor 54 is permitted to slide easily downwardly. When anchor 54 is fully burried, pipe 76 is disconnected from the source of pressurized air or water and end 72 of bolt 68 is unscrewed from end 64 of cylinder 60. Since end 72 is oppositely threaded from end 70, as bolt 68 is unscrewed from cylinder 60, bolt 68 is simultaneously screwed onto pipe 74. Thus, pipes 76 and 74 along with bolt 68 are unscrewed from cylinder 60, leaving cylinder 60 and flukes 56 in place within cavity 82. A line is now secured to loop 66 on cylinder 60, and cylinder 60 is pulled upwardly, causing outwardly flared portions 84 of flukes 56 to engage the sides of cavity 82. As cylinder 60 is pulled further upwardly, flukes 56 are pulled into their fully open position, as shown in FIGS. 9 and 10. Flukes 56 and flared ends 84 thus become imbedded into the sides of cavity 82, firmly securing anchor 54 therein. The line passing through hook 66, as shown in FIG. 6, is then passed through a grommet 14 in the bottom edge 42 of curtain 12 and is tensioned to properly anchor edge 42.

Figure 3:
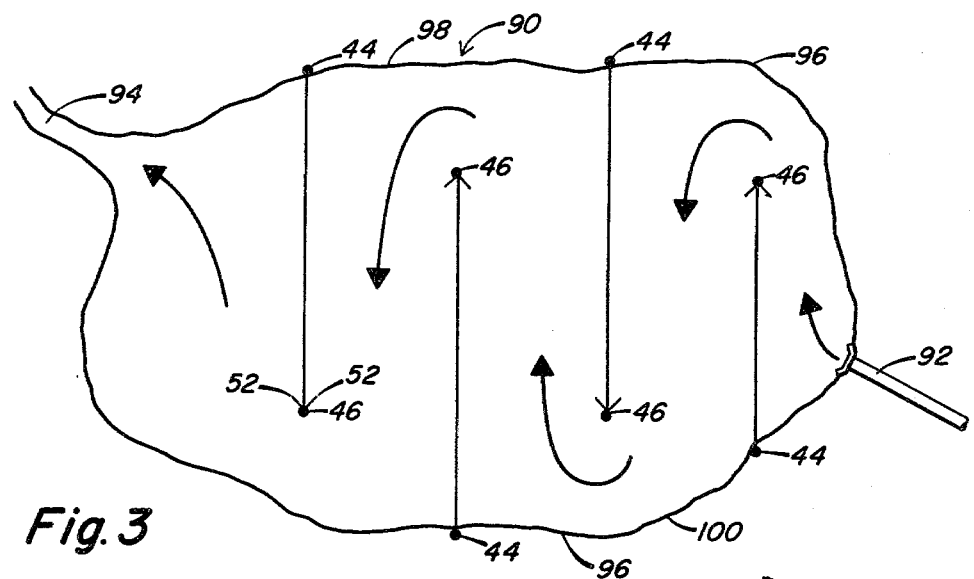
FIG. 3 exemplifies a preferred deployed configuration of the barrier of FIG. 1.

With reference now to FIG. 3, a typical method of deployment and a deployed configuration of barrier 10 will be described. A pond or other body of water 90 has an inflow 92 and an outflow 94 and it is desired to retard the flow from inflow 92 to outflow 94. Typically, a baffle structure is created which includes a plurality of parallel barriers 10 positioned transversely of the general flow direction. Barriers 10 each have a post 44 anchored adjacent the shore line 96, typically, above the water level outside of body of water 90. A second post 46 is positioned within body of water 90 and spaced from the shoreline 96 on a side opposite the side of the shoreline adjacent to which post 44 is disposed. Posts 44 are placed alternately along sides 100 and 98 so that associated posts 46 are spaced alternately from sides 98 and sides 100, thereby creating a baffled flow, as shown in FIG. 3, wherein the current must pass from side 98 and then to side 100 and back to side 98 again as it goes from inflow 92 to outflow 94. The speed with which a particular parcel of water passes from inflow 92 to outflow 94 depends upon the number of such barriers erected, the spacing between the barriers, the head or amount of pressure at the inflow and outflow and the spacing between each post 46 and sides 100 or 98. Since the barriers each extend from the bottom of the basin to above the top of the water level, the barriers are each effective to completely divert the flow therearound and do not permit any of it to pass therethrough. This baffling effect provides sufficient time for the water to become aerated, or for sedimentation to occur or for the entire body of water to be properly cooled to the prevailing temperature prior to its passage through outflow 94. A typical baffle configuration as shown in FIG. 3 can increase the water retention time from five to seventy-two days.

The process utilized in erecting the baffle configuration as shown in FIG. 3 will now be described. As indicated, the number of barriers 10 will depend upon the head of pressure at inflow 92 and outflow 94, and upon the amount of time required for a parcel of water to travel through body of water 90. In one example, in a pond measuring 1000 feet by 1000 feet, and having a pressure head of two pounds per square foot, five barriers will be required. The spacing of post 46 from the opposite side of the pond is also an inverse function of the desired time of travel of the water from inflow 92 to outflow 94. Once the number of barriers and the position of each one has been determined, a survey is conducted to determine the precise contour of the bottom of the pond. The bottom edge 42 of each barrier 10 is then configured to conform to this contour prior to the installation of each barrier 10. Once it has been contoured, barrier 10 is erected by first implanting post 44 at the desired location along the shoreline 96. The preconstructed curtain 12 is then unwrapped and placed into position in the pond. Weights 40 aid in retaining lower edge 42 adjacent the bottom of the pond, while floats 32 retain upper edge 36 above the surface of the pond during installation. Once the curtain 12 is in position, posts 44 and 46 are imbedded into surface 48 and respective edges 45 and 47 of curtain 12 are attached thereto by passing lines 50 and 51 through grommets 14. The edge 45 of curtain 12 is first attached securely so that edge 45 is closely abutting post 44. Next, edge 47 of curtain 12 is tensioned against post 46 by applying pressure to lines 51 until curtain 12 has been stretched its full length and has acquired the proper tension between posts 44 and 46. Then lines 51 on post 46 are secured. Posts 52 may also be installed on either side of post 46 to brace post 46 and to prevent post 46 from bending or becoming dislodged as a result of the tension on curtain 12. Divers must then go to the bottom of the pond to imbed anchors 54 into the ground adjacent associated grommets 14 along bottom edge 42. The anchors are imbedded as previously described, and lines are attached from loops 66 to grommets 14 on lower edge 42 and are tensioned until lower edge 42 has been pulled as closely as possible to surface 48. Floats 32 are attached by means of the hooks on the ends of chains 34 which go through the loops formed thereon. Floats 32 may be replaced at any time and are easily accessible by a boat at the surface of the water.

The above described curtain is also suitable for use as a boom to contain oil spills or spills of other debris on the surface of a body of water. When used for such a purpose, lower edge 42 of curtain 12 need not be contoured and need only project a short distance below the surface of the water. Furthermore, anchors 46 are not necessary, since weights 40 and ribs 22 are adequate to maintain the vertical alignment of curtain 12. The curtain may be anchored by means of posts 44 and 46 as previously described or it may be deployed in a circle, with its lateral edges secured together by means of grommets 14. The outrigger configuration of floats 32 provide additional stability to maintain curtain 12 in its desired vertical orientation. Floats 32 in combination with ribs 22 and weights 40 ensure that such a vertical orientation will be maintained under normal conditions.

With respect to dimensions, curtain 12 may be of any height or length desired. Typically, the reinforcing strip 13 has a width of about 2 inches. The ribs 22 have a diameter of 0.375 inches and a length which is a function of the height of curtain 12. Ribs 22 are generally placed every two feet along the length of the curtain 12. An anchor typically has a length of about 18 inches and a diameter of about 1 to 2 inches and is placed about every fifty feet along the curtain. Floats 32 may be of any convenient size but typically are cylinders having a diameter of about 5 inches and a length of about 10 inches. With respect to materials, plates 26 and all grommets 14 are typically formed of stainless steel. Weights 40 are typically formed of lead while curtain 12 is typically a Nylon webbing impregnated with polyvinylchloride. The Nylon webbing typically has a lockstitch to prevent tearing thereof. The Nylon contained in curtain 12 is typically 22 ounce Nylon with a 600 pound per square inch tensile strength. Floats 32 are formed of polypropelene, and are disposed such that one half is above water and the other half is below water. The ribs 22 typically are formed of polyglass polyester.

In view of the above description, it is likely that modifications and improvements will occur to those skilled in the art which are within the scope of this invention.

What is claimed is:

1. A system for diverting the flow of water through a water course having a flow direction therethrough and having a first bank and a second bank disposed generally transversely of the flow direction, comprising:

a plurality of parallel impermeable flexible curtain barriers disposed transversely of said flow direction, said barriers being alternately spaced from said first bank and extending to said second bank, and being spaced from said second bank and extending to said first bank to form a baffle configuration;

means for anchoring a lower edge of each of said barriers to the bottom of said water course;

means for anchoring a first end of each of said barriers to a selected one of said first bank and said second bank;

means for selectively anchoring a second end of each of said barriers to the bottom of said water course at a point spaced selectively from said first bank and said second bank; and means for maintaining an upper longitudinal edge of each of said barriers above the water level of said water course.

2. A system according to claim 1 wherein said anchoring means comprise anchors adapted to be imbedded in the bottom of said water course and having a pair of pivotably mounted flukes for engaging the sides of a hole into which said anchor is inserted.

3. A system according to claim 2 wherein said anchor further comprises means for conducting a pressurized fluid therethrough toward the bottom of said water course for creating a hole into which said anchor is permitted to fall.

4. The system according to claim 3 wherein said anchor further comprises tethering means for attaching said anchor to said lower edge of said barrier.

5. The system according to claim 1 wherein said maintaining means comprises a plurality of floats.

6. The system according to claim 5 wherein said plurality of floats comprises hollow cylinders, each of said cylinders being mounted onto a side of one of said barriers directly opposite another of said cylinders mounted to said barrier on the other side thereof.

7. The system according to claim 6 wherein said floats are removably secured to said barrier.

8. The system according to claim 1 further comprising a plurality of spaced, parallel ribs extending from said lower edge to an upper edge of each of said barriers.

9. A marine barrier comprising:

an impermeable, flexible curtain extending in a longitudinal direction through a body of water transversely of the flow thereof, said curtain having a first side, a second side, an upper longitudinal edge, a lower longitudinal edge, a first end and a second end;

a plurality of equally spaced, parallel ribs extending generally from said upper longitudinal edge to said lower longitudinal edge;

a pocket enclosing each of said reinforcing ribs;

a pair of metal plates associated with each end of each of said reinforcing ribs, one of said plates being disposed on said first side of said curtain and the other of said plates being disposed on said second side of said curtain to capture the associated end of said reinforcing rib and its pocket therebetween;

a plurality of hollow cylindrical floats removably secured to said first side and to said second side of said curtain a predetermined distance below said upper longitudinal edge of said curtain to retain said upper longitudinal edge above the water level of said body of water, each of said floats on said first side being disposed directly opposite a float on said second side of said curtain;

a plurality of anchors secured to said lower longitudinal edge of said curtain and being buried in the bottom of a basin containing said body of water, each of said anchors retaining said lower longitudinal edge of said curtain closely adjacent the bottom of the basin containing said body of water;

a first post securing said first end of said curtain to a point on a first bank of said body of water without said body of water;

a second post secured to said second end of said curtain within said body of water and spaced from a bank opposite said first bank;

means for bracing said second post; and means for tensioning said curtain between said first post and said second post.

* * * * *